US012753742B2

(12) United States Patent
Carr et al.

(10) Patent No.: US 12,753,742 B2
(45) Date of Patent: Oct. 6, 2026

(54) SMA ACTUATOR ASSEMBLY

(71) Applicant: CAMBRIDGE MECHATRONICS LIMITED, Cambridge (GB)

(72) Inventors: Joshua Carr, Cambridge (GB); Daniel John Burbridge, Cambridge (GB); Andrew Benjamin Simpson Brown, Cambridge (GB); Stephen Matthew Bunting, Cambridge (GB); David Richards, Cambridge (GB); Samuel Armstrong, Cambridge (GB); Robin Eddington, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 174 days.

(21) Appl. No.: 18/286,489

(22) PCT Filed: Apr. 14, 2022

(86) PCT No.: PCT/GB2022/050965
§ 371 (c)(1),
(2) Date: Oct. 11, 2023

(87) PCT Pub. No.: WO2022/219361
PCT Pub. Date: Oct. 20, 2022

(65) Prior Publication Data

US 2024/0376873 A1 Nov. 14, 2024

(30) Foreign Application Priority Data

Apr. 14, 2021 (GB) ..................................... 2105294

(51) Int. Cl.
*F03G 7/06* (2006.01)

(52) U.S. Cl.
CPC ....... *F03G 7/06143* (2021.08); *F03G 7/0665* (2021.08)

(58) Field of Classification Search
CPC ........................... F03G 7/06143; F03G 7/0665
See application file for complete search history.

(56) References Cited

U.S. PATENT DOCUMENTS 6,232,555 B1 5/2001 Besler et al.
8,127,543 B2 3/2012 Von Behrens et al.
(Continued)

FOREIGN PATENT DOCUMENTS

EP 0944130 A2 9/1999
JP 2018-178783 A 11/2018
(Continued)

OTHER PUBLICATIONS

International Search Report and Written Opinion received for PCT Patent Application No. PCT/GB2022/050965, mailed on Jul. 28, 2022, 16 pages.
(Continued)

*Primary Examiner* — Minh Q Phan
(74) *Attorney, Agent, or Firm* — Van Hoven PC; Stefan D. Osterber; Joshua Van Hoven

(57) ABSTRACT

An SMA actuator assembly (2) comprising: a support structure (10); a movable part (20) that is movable relative to the support structure; and an SMA wire (30) connected at its ends to the movable part and/or the support structure and arranged to move the movable part relative to the support structure, wherein the SMA wire is arranged to be in contact between its ends with one or more contact portions of the movable part and/or support structure, and wherein each contact portion comprises a plurality of contact sections (10*a*, 20*a*) that are in direct contact with the SMA wire, wherein the plurality of contact sections are separated by one or more gaps between the contact sections.

12 Claims, 4 Drawing Sheets

(56) References Cited

U.S. PATENT DOCUMENTS

| | | | |
|---|---|---|---|
| 2002/0113499 A1 | 8/2002 | Von et al. | |
| 2004/0035687 A1 | 2/2004 | Von et al. | |
| 2005/0172462 A1 | 8/2005 | Rudduck et al. | |
| 2010/0236236 A1 | 9/2010 | Mankame et al. | |
| 2011/0088387 A1 | 4/2011 | Von Behrens et al. | |
| 2011/0296826 A1 | 12/2011 | Pinto, IV et al. | |
| 2013/0154984 A1 | 6/2013 | Gondo | |
| 2016/0258425 A1 | 9/2016 | Ladwig et al. | |
| 2020/0252009 A1* | 8/2020 | Iino | G04G 21/08 |

FOREIGN PATENT DOCUMENTS

| | | |
|---|---|---|
| WO | 03/93615 A1 | 11/2003 |
| WO | 2018/204888 A1 | 11/2018 |
| WO | 2022/136886 A1 | 6/2022 |

OTHER PUBLICATIONS

Office Action received for GB Patent Application No. 2105294.9, mailed on Sep. 27, 2022, 8 pages.
Extended European Search Report for European Application No. 26152121.5, mailed May 7, 2026, 10 pages.

* cited by examiner

SMA ACTUATOR ASSEMBLY

CROSS-REFERENCE TO RELATED APPLICATIONS

This application is a national stage application under 35 U.S.C. § 371 of International Application No. PCT/GB2022/050965, filed Apr. 14, 2022, which claims priority of GB Patent Application No. 2105294.9, filed Apr. 14, 2021, the disclosures of each of which are hereby incorporated by reference herein in their entireties.

FIELD

The present invention relates to a shape memory alloy (SMA) actuator assembly, in particular to such an assembly that incorporates heat sinks to set the thermal environment of the SMA wires of the SMA actuator assembly. The present invention also relates to techniques for setting the thermal environment of SMA actuator assemblies in which a middle portion of the SMA wire is in direct contact with another component.

BACKGROUND

There are a variety of types of actuator assembly in which it is desired to provide positional control of a movable part. SMA wire is advantageous as an actuator in such an actuator assembly, in particular due to its high energy density which means that the SMA wire required to apply a given force is of relatively small size.

One type of actuator assembly in which SMA wire is known for use as an actuator is a camera, particularly a miniature camera. The actuator assembly may, for example, be used to provide optical image stabilization (OIS) or auto-focus (AF) in such a camera.

For example, WO 2013/175197 A1 discloses a SMA actuator assembly in which a total of four SMA wires are used to provide OIS, by moving a movable lens element relative to an image sensor on a support structure to any position across a range of movement in two orthogonal directions, without applying any net torque to the movable part. WO 2017/072525 A1 discloses an SMA actuator assembly in which SMA wires are used to provide OIS by moving a movable image sensor relative to a lens element. WO 2011/104518 A1 discloses an SMA actuator assembly in which eight SMA wires that are each inclined with respect to a notional primary axis are used to provide OIS and/or AF.

WO 2007/113478 A1 discloses an SMA actuator assembly in which an AF or zoom function is achieved using a V-shaped SMA wire. WO 2019/243849 A1 discloses an another SMA actuator assembly including a bearing assembly that translates a torque applied by an SMA wire into helical movement of a movable part, thereby achieving an AF or zoom function in an alternative manner.

Additionally, SMA wires may be used in an SMA actuator assembly for other optical or non-optical purposes, such as to perform 3D sensing. For example, WO 2018/096347 A1, WO 2019/193337 A1 and WO 2020/030916 A1 each disclose different SMA actuator assemblies for depth mapping of an object ore for generating 3D representations/performing 3D sensing.

SMA wires may also be used in an SMA actuator assembly for the purpose of providing haptic feedback. For example, WO 2019/162708 A1 and PCT/GB2020/053252 disclose SMA actuator assemblies with an SMA wire that, upon contraction, provides haptic feedback to a user.

All of these SMA actuator assemblies takes advantage of the property of an SMA wire to change in length with a change in temperature. As the SMA wire is heated, for example by driving a current through the SMA wire or by any other suitable means, the SMA wire contracts. The wire expands upon cooling of the SMA wire, usually by ceasing supply of a drive current or other heating means to the SMA wire. To accurately control the length of the SMA wire, and so to accurately control the position of the movable part relative to the support structure, it is thus advantageous appropriately to set the thermal environment of the SMA wire.

SUMMARY

The present invention is thus concerned with improved techniques for setting or controlling the thermal environment of an SMA wire in an SMA actuator assembly.

According to an aspect of the present invention, there is provided an SMA actuator assembly comprising a support structure; a movable part that is movable relative to the support structure; and an SMA wire connected at its ends to the movable part and/or the support structure and arranged to move the movable part relative to the support structure, wherein the SMA wire is arranged to be in contact between its ends with one or more contact portions of the movable part and/or support structure, wherein each contact portion comprises a plurality of contact sections that are in direct contact with the SMA wire, wherein the plurality of contact sections are separated by one or more gaps between the contact sections.

The contact portions affect the thermal environment of the SMA wire, by allowing for conductive heat transfer from the SMA wire to the contact portions. Providing continuous contact portions may lead to a relatively large heat transfer away from the SMA wire. Such a large heat transfer may increase the power required to heat the SMA wire and reduce the uniformity of the thermal environment along the SMA wire. The contact regions are thus instead provided by contact sections that are separated by gaps, thus reducing the cooling rate in the contact regions. This may reduce the power required to heat the SMA wires and improve the uniformity of the thermal environment along the SMA wire.

In some embodiments, the ratio of the width of the one or more gaps to the diameter of the SMA wire is less than 40, preferably less than 15, more preferably less than 5. The ratio of the width of the contact sections to the diameter of the SMA wire is less than 40, preferably less than 15, more preferably less than 5.

In some embodiments, the contact sections are substantially evenly spaced apart along a major portion of the SMA wire. The variation in the spacing between contact sections along the major portion of the SMA wire may be less than 10%, preferably less than 5%. The variation may be less than 1%. The major portion of the SMA wire may be at least 50% of the length of the SMA wire, preferably at least 90% or at least 95% of the length of the SMA wire.

In some embodiments, the SMA wire is connected between the movable part and the support structure by connection elements. One end of the SMA wire may be connection to the movable part and another end of the SMA wire may be connected to the support structure. Alternatively, both ends may be connected to the movable part or the support structure, with a middle portion of the SMA wire being in contact respectively with the support structure or the movable part.

In some embodiments, the SMA wire is substantially straight between the connection elements. The SMA wire may also comprise a plurality of substantially straight lengths between the connection elements. The straight lengths may be in contact with the contact sections along their lengths. So, the SMA wire need not bend around the contact sections. The contact sections may not affect the path of the SMA wire between the connection elements.

In some embodiments, the SMA wire is arranged, on contraction, to pivot within a movement plane about at least one of the connection elements upon movement of the movable part relative to the support structure, wherein the contact sections are provided in the movement plane. The movable part may be movable in the movement plane, and movement of the movable part in directions other than along the movement plane may be constrained. The contact sections may be arranged to remain in contact with the SMA wire throughout the entire range of movement of the SMA wire. The contact sections may extend in a plane.

In some embodiments, the SMA wire is arranged to bend around the one or more contact portions.

In some embodiments, the movable part and the support structure are movable relative to each other along a movement axis; and wherein the one or more contact portions of the movable part and/or support structure guide the SMA wire along a tortuous path with a curved section of the SMA wire extending around the or each contact portion and intermediate sections of the SMA wire extending between the movable part and the support structure such that the movable part and the support structure are driven in opposite directions along the movement axis on contraction of the SMA wire. The SMA actuator assembly may thus be a haptic wave.

In some embodiments, each of the movable part and the support structure comprises at least one contact portion which contacts the SMA wire on opposite sides thereof.

In some embodiments, the movable part has plural contact portions, the contact portions of the movable part and the support structure alternating in a direction normal to the movement axis. Each of the movable part and the support structure may have plural contact portions.

In some embodiments, the SMA wire is connected at each end to the movable part or the support structure by respective connection elements that hold the SMA wire. The connection elements may be crimps.

In some embodiments, at least one the movable part or the support structure comprises a sheet of material (e.g. sheet metal) that is shaped to define the contact portions. The connection elements, e.g. the crimps, may be integrally formed with the sheet of material. The gaps may be formed by recesses that extend partway through the sheet of material.

According to another aspect of the present invention, there is provided an SMA actuator assembly comprising a support structure; a movable part that is movable relative to the support structure; an SMA wire connected at its ends to the movable part and/or the support structure and arranged to move the movable part relative to the support structure; and a heat sink arranged adjacent to the SMA wire such that the thermal environment along a major portion of the SMA wire is substantially uniform.

The provision of the heat sink ensures that the thermal environment along the SMA wire remains relatively uniform. Without the heat sink, cooling of the SMA wire might take place only/primarily via the end connections to the movable part and/or support structure. This can lead to an undesirable temperature difference between the ends of the SMA wire (with relatively high conductive heat transfer) and the middle of the SMA wire (with relatively low conductive heat transfer), both during heating and during cooling of the SMA wire. Such a temperature difference may make accurate control of the length of the SMA wire difficult. In addition, such a temperature difference may lead to premature failure of the SMA wire.

In some embodiments, the heat sink is shaped such that the minimum distance between the heat sink and a middle section of the SMA wire is substantially constant, and such that the minimum distance between the heat sink the SMA wire increases towards the ends of the SMA wire. The heat sink may taper away from the SMA wire towards the ends of the SMA wire. The ends of the SMA wire may be connected to connection elements, through which heat is lost from the SMA wire. It may thus be desirable to reduce the effect of the heat sink at the ends of the SMA wire, so as to provide an overall more uniform thermal environment.

In some embodiments, the SMA wire is arranged to move laterally in a movement plane across a range of movement, wherein the heat sink is arranged such that the thermal environment along the major portion of the SMA wire is substantially constant over the range of movement of the SMA wire. The distance between the SMA wires and the heat sink may remain constant on movement of the SMA wires. The movable part may be movable in the movement plane, and constrained from moving in direction other than in the movement plane. The SMA actuator assembly may comprise plural SMA wires arranged, on contraction, to move the movable part in two orthogonal directions in the movement plane.

In some embodiments, the heat sink is arranged adjacent to the movement plane. The heat sink, in particular the surface of the heat sink facing the SMA wire, may extend parallel to the movement plane.

In some embodiments, the heat sink is arranged to move with the SMA wire. The heat sink may be mechanically connected at one end to the support structure and at the other end to the movable part, wherein the heat sink pivots relative to the support structure and/or the movable part upon movement of the movable part relative to the support structure.

In some embodiments, the SMA actuator assembly comprises two or more SMA wires each arranged to move the movable part relative to the support structure, and wherein one or more heatsinks are arranged adjacent to each SMA wire such that the thermal environment along a major portion of each SMA wire is substantially the same. The two or more SMA wires may be arranged to apply opposing forces to the movable part with respect to the support structure.

In some embodiments, the SMA wire is arranged, on contraction, to move laterally between a first extreme position and a second extreme position, and the heat sink comprises a first portion arranged adjacent to the first extreme position such that the thermal environment along a major portion of the SMA wire in the first extreme position is substantially constant, and wherein the heat sink comprises a second portion arranged adjacent to the second extreme position such that the thermal environment along a major portion of the SMA wire in the second extreme position is substantially constant.

In some embodiments, the ends of the SMA wire are attached to the support structure and/or to the movable part using respective connection elements. The connection elements may be crimps.

In some embodiments, the connection elements and the heat sink are integrally formed from the same material, for example from metal such as sheet metal.

In some embodiments, the heat sink comprises a static portion that is fixed relative to the support structure and a movable portion that is fixed relative to the movable part.

In some embodiments, the static portion extends along the half of the SMA wire that is connected to the support structure, and the movable portion extends along the half of the SMA wire that is connected to the movable part.

In some embodiments, the SMA wire is arranged, on contraction, to move laterally between a first extreme position and a second extreme position, and wherein the static portion comprises a first portion arranged adjacent to the first extreme position such that the thermal environment along a major portion of the half of the SMA wire in the first extreme position is substantially constant, and wherein the static portion comprises a second portion arranged adjacent to the second extreme position such that the thermal environment along a major portion of the half of the SMA wire in the second extreme position is substantially constant; and wherein the movable portion comprises a first portion arranged adjacent to the first extreme position such that the thermal environment along a major portion of the half of the SMA wire in the first extreme position is substantially constant, and wherein the movable portion comprises a second portion arranged adjacent to the second extreme position such that the thermal environment along a major portion of the half of the SMA wire in the second extreme position is substantially constant.

In some embodiments, the major portion of the SMA wire comprises at least 75% of the SMA wire, preferably at least 90% of the SMA wire.

The minimum distance between the heat sink and the major portion of the SMA wire may be substantially constant, preferably vary by less than 10%, or less than 5%, or less than 1%.

In some embodiments, the minimum distance between the heat sink and the major portion of SMA wire is at least 25 μm, preferably at least 75 μm, further preferably at least 150 μm. The minimum distance between the heat sink and the major portion of SMA wire may be less than 3 mm, preferably less than 2 mm, further preferably less than 1 mm.

In some embodiments, the heat sink is arranged closer to the major portion of the SMA wire than any other component of the SMA actuator assembly (which may exclude the connection elements connecting the SMA wire to the movable part and/or support structure). So, the heat sink may dominate the thermal environment of the SMA wire.

In some embodiments, the SMA wire has a length of less than 8 mm, preferably less than 6.5 mm, further preferably less than 5.5 mm.

In some embodiments, the heat sink is formed from a metal, such as a steel.

In some embodiments, the heat sink is fixed relative to the support structure and/or relative to the movable part.

In some embodiments, the SMA actuator assembly comprises at least two SMA wires arranged, on contraction, to move the movable part in a plane, wherein the heat sink extends parallel to the plane.

In some embodiments, the SMA actuator assembly comprises a total of four shape memory alloy actuator wires connected between the movable part and the support structure in an arrangement wherein none of the SMA wires are collinear.

In some embodiments, the SMA actuator assembly comprises eight SMA wires inclined with respect to a notional primary axis with two SMA wires on each of four sides around the primary axis, the SMA wires being connected between the movable part and the support structure so that, on contraction, two groups of four SMA wires provide a force on the movable element with a component in opposite directions along the primary axis. The SMA wires of each group may be arranged with 2-fold rotational symmetry about the primary axis.

Further aspects of the present invention are set out in the dependent claims, as well as in the detailed description below.

BRIEF DESCRIPTION OF THE DRAWINGS

Embodiments of the present invention will now be described by way of example with reference to the accompanying drawings in which.

DETAILED DESCRIPTION

In the following description, the present invention will be described with reference to, among others, a camera in which OIS and/or AF is desired. However, this is one non-limiting example use of the present invention and it will be understood that the present invention may be used in any optical system or non-optical system and for any purpose. For example, the present invention may be used to improve the performance of a system used to perform 3D sensing (i.e. generate a 3D representation of a scene) or in haptics applications.

Figure 1:
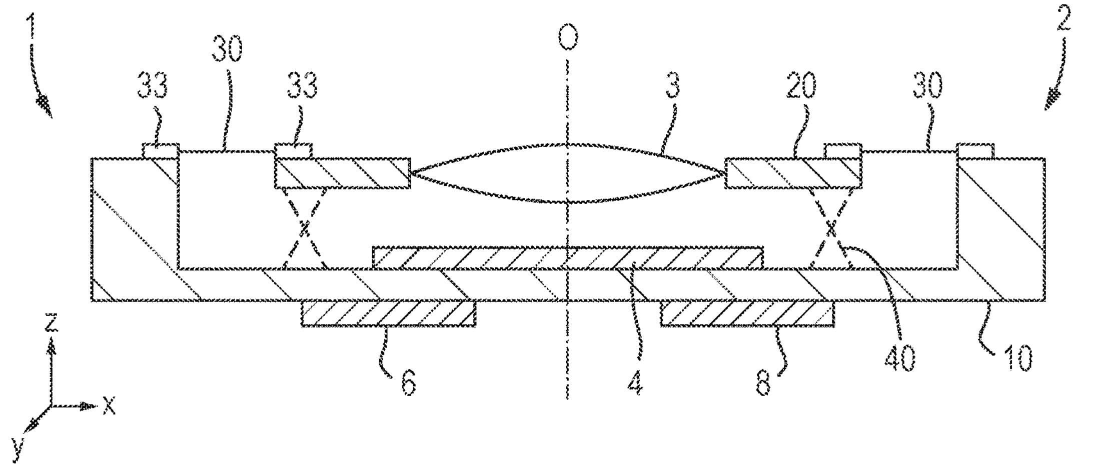
FIG. 1 is a schematic side view of a camera apparatus incorporating an SMA actuator assembly.

FIG. 1 schematically shows a camera apparatus 1 that incorporates an SMA actuator assembly 2 in accordance with the present invention. The camera apparatus 1 is to be incorporated in a portable electronic device such as a mobile telephone, or tablet computer. Thus, miniaturisation is an important design criterion.

The SMA actuator assembly 2 comprises a support structure 10 and a movable part 20. The movable part 20 is supported on the support structure 10. The movable part 20 is movable relative to the support structure 10. The movable part 20 may be movable in a plane, in particular in the x-y plane. Additionally or alternatively, the movable part 20 may be movable along a primary axis, in particular along the z-axis or optical axis O.

The SMA actuator assembly 2 comprises one or more SMA wires 30. The SMA wires 30 may be connected in tension between the support structure 10 and the movable part 20. The SMA wires 30 may be connected at their ends to the support structure 10 and/or to the movable part 20 using connection elements 33, for example crimp connections. The crimp connections may crimp the SMA wires to hold them mechanically, as well as providing electrical connections to the SMA wires 30. However, any other suitable connections may alternatively be used. In some embodiments, both ends of the SMA wire 30 may be connected to the support structure 10 or to the movable part 20, and a middle portion of the SMA wire 30 may bend around the other of the support structure 10 or the movable part 20. The SMA wires 30 are capable, on selective contraction, of driving movement of the movable part 20 with respect to the support structure 10.

The movable part 20 may be supported (so suspended) on the support structure 10 exclusively by the SMA wires 30. However, preferably, the SMA actuator assembly 2 comprises a bearing arrangement 40 that supports the movable part on the support structure 10. The bearing arrangement 40 may have any suitable form for allowing movement of the movable part 20 with respect to the support structure 10 in the x-y plane. For this purpose, the bearing arrangement 40 may, for example, comprise a rolling bearing, a flexure bearing or a plain bearing. The bearing arrangement 40 may constrain or prevent movement of the movable part 20 relative to the support structure 10 in the z-direction. The bearing arrangement 40 may constrain movement in the x-y plane within a particular range of movement.

The camera apparatus 1 further comprises a lens assembly 3 and an image sensor 4. The lens assembly 3 comprises one or more lenses configured to focus an image on the image sensor 4. The image sensor 4 captures an image and may be of any suitable type, for example a charge coupled device (CCD) or a CMOS device. The lens assembly 3 comprises a lens carrier, for example in the form of a cylindrical body, supporting the one or more lenses. The one or more lenses may be fixed in the lens carrier, or may be supported in the lens carrier in a manner in which at least one lens is movable along the optical axis O, for example to provide zoom or focus, such as auto-focus (AF). The camera apparatus 1 may be a miniature camera apparatus in which the or each lens of the lens assembly 3 has a diameter of 20 mm or less, preferably of 12 mm or less. For ease of reference, the z axis is taken to be the optical axis O of the lens assembly 3 and the x and y axes are perpendicular thereto. In the desired orientation of the lens assembly 3, the optical axis O is perpendicular to a light-sensitive region of the image sensor 4 and the x and y axes are parallel to the light-sensitive region of image sensor 20.

In the embodiment shown in FIG. 1, the movable part 20 comprises the lens assembly 3. The image sensor 4 may be fixed relative to the support structure 10, i.e. mounted on the support structure 10. In other embodiments (not shown), the lens assembly 3 may be fixed (in the x-y plane) relative to the support structure 10 and the movable part 20 may comprise the image sensor 4. In either embodiment, in operation the lens assembly 3 is moved relative to the image sensor 4 orthogonally to the optical axis O in the x-y plane. This has the effect that the image on the image sensor 4 is moved. This is used to provide OIS, compensating for image movement of the camera apparatus 1, caused for example by a user's handshake.

The camera apparatus 1 comprises a vibration sensor 6 and a control circuit 8. The vibration sensor 6 may be a gyroscope sensor, for example, although in general other types of vibration sensor 6 could be used. The vibration sensor 6 detects vibrations that the camera apparatus 1 is experiencing and generates output signals representative of the vibration of the camera apparatus 1. The control circuit 8 may be implemented in an integrated circuit (IC) chip. The control circuit 8 generates drive signals for the SMA wires 30 in response to the output signals of the vibration sensor 6. SMA material has the property that on heating it undergoes a solid-state phase change that causes the SMA material to contract. Thus, applying drive signals to the SMA wires 30, thereby heating the SMA wires 30 by allowing an electric current to flow, will cause the SMA wires 30 to contract and move the movable part 20. The drive signals are chosen to drive movement of the movable part 20 in a manner that stabilizes the image sensed by the image sensor 4. The control circuit 8 supplies the generated drive signals to the SMA wires 30, thereby providing OIS.

The schematic of FIG. 1 is just one generic example of an actuator assembly that uses SMA to move a movable part relative to a support structure. Embodiments of the present invention include any actuator assemblies in which an SMA wire is arranged to move the movable part relative to the support structure.

In some embodiments, the SMA actuator assembly corresponds to the SMA actuation apparatus of WO 2013/175197 A1, which is herein incorporated by reference. So, the SMA actuator assembly may comprise a support structure; a movable part supported on the support structure in a manner allowing movement of the movable element relative to the support structure across a range of movement in two orthogonal directions perpendicular to a notional primary axis extending through the movable element; and a total of four SMA actuator wires connected between the movable element and the support structure in an arrangement wherein none of the SMA actuator wires are collinear, and wherein the SMA actuator wires are capable of being selectively driven to move the movable element relative to the support structure to any position in said range of movement without applying any net torque to the movable element in the plane of the two orthogonal directions around the primary axis.

In some embodiments, the SMA actuator assembly corresponds to the SMA actuation apparatus of WO 2017/072525 A1, which is herein incorporated by reference. So, the SMA actuator assembly may comprise a support structure; an image sensor having a light-sensitive region, the image sensor being suspended on the support structure in a manner allowing movement of the image sensor relative to the support structure in any direction laterally to the light-sensitive region of the image sensor; and plural shape memory alloy actuator wires in an arrangement capable, on selective driving thereof, of moving the image sensor relative to the support structure in any direction laterally to the light-sensitive region of the image sensor.

In some embodiments, the SMA actuator assembly corresponds to the SMA actuation apparatus of WO 2011/104518 A1, which is herein incorporated by reference. So, the SMA actuator assembly may comprise a support structure; a movable element supported on the support structure in a manner allowing movement of the movable element relative to the support structure; and eight SMA actuator wires inclined with respect to a notional primary axis with two SMA actuator wires on each of four sides around the primary axis, the SMA actuators being connected between the movable element and the support structure so that on contraction two groups of four SMA actuator wires provide a force on the movable element with a component in opposite directions along the primary axis, the SMA actuator wires of each group being arranged with 2-fold rotational symmetry about the primary axis.

In some embodiments, the SMA actuator assembly corresponds to the SMA actuation apparatus of WO 2007/113478 A1, which is herein incorporated by reference. So, the SMA actuator assembly may comprise a support structure; a camera lens element supported on the support structure by a suspension system which guides movement of the camera lens element relative to the support structure along the optical axis of the camera lens element; and at least one pair of lengths of SMA wire held in tension between the camera lens element and the support structure, the lengths of SMA wire in the pair being coupled to one of the camera lens element and the support structure at a common point and extending therefrom at acute angles of opposite sign relative to the optical axis as viewed radially of the optical axis, the lengths of SMA wire in the pair extending at an angle of less than 180 degrees relative to each other as viewed along the optical axis.

In some embodiments, the SMA actuator assembly corresponds to the SMA actuation apparatus of WO 2019/243849 A1, which is herein incorporated by reference. So, the SMA actuator assembly may comprise a support structure; a movable element; a helical bearing arrangement supporting the movable element on the support structure and arranged to guide helical movement of the movable element with respect to the support structure around a helical axis; and at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

In some embodiments, the SMA actuator assembly corresponds to the SMA actuation apparatus of WO 2019/162708 A1, which is herein incorporated by reference. So, the SMA actuator assembly may comprise a housing comprising a cavity; a button provided within the cavity and moveable along a first axis within the cavity; at least one intermediate moveable element provided within the cavity in contact with the button and moveable in a plane defined by the first axis and a second axis, the second axis being perpendicular to the first axis, and arranged to drive movement of the button along the first axis; and at least one SMA wire coupled to the at least one intermediate moveable element and arranged to, on contraction, move the intermediate moveable element in the plane.

In some embodiments, the SMA actuator assembly corresponds to the SMA actuation apparatus of PCT/GB2020/053252, which is herein incorporated by reference. So, the SMA actuator assembly may comprise first and second parts that are movable relative to each other along a movement axis; and a length of SMA wire, each of the ends of the length of SMA wire being connected to the first or second part, at least one of the first and second parts comprising at least one contact portion arranged in contact with the SMA wire so as to guide the length of SMA wire along a tortuous path with a curved section of the length of SMA wire extending around the or each contact portion and intermediate sections of the length of SMA wire extending between the first and second parts such that the first and second parts are driven in opposite directions along the movement axis on contraction of the length of SMA wire.

Figure 2:
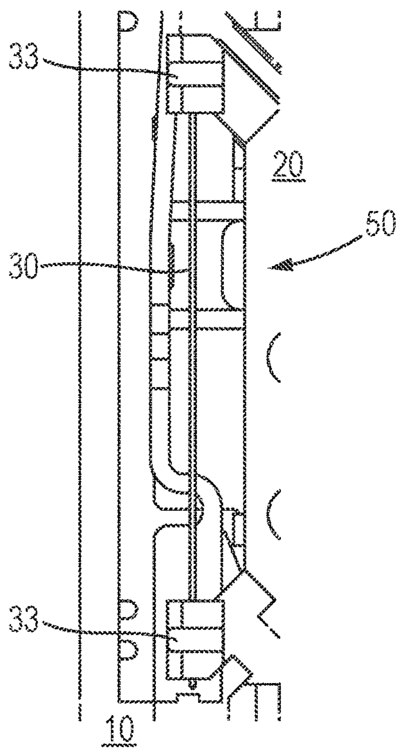
FIG. 2 is a view of an SMA wire arranged adjacent to a heat sink.

As shown in FIG. 2, the SMA actuator assembly of embodiments of the present invention comprises a heat sink 50 arranged adjacent to the SMA wire 30. The heat sink 50 ensures that the thermal environment along a major portion of the SMA wire 30 is substantially uniform.

The major portion of the SMA wire 30 comprises at least 50% of the SMA wire. Preferably, the major portion of the SMA wire 30 comprises at least 75% of the SMA wire. Further preferably, the major portion of the SMA wire 30 comprises at least 90% of the SMA wire 30. The major portion of the SMA wire 30 may be a central portion of the SMA wire 30, i.e. a portion of the SMA wire 30 between the ends of the SMA wire 30. The larger the portion of the SMA wire 30 along which the thermal environment is substantially uniform, the easier it is to accurately control the length of the SMA wire 30. Furthermore, the risk of damage to the SMA wire 30 is reduced.

The thermal environment may be substantially uniform in the sense that it varies by less than 10%, preferably less than 5%. This means, that the heat transfer from the SMA wire 30 to the heat sink 50 is substantially uniform (varying by less than 10%, preferably less than 5%) along the major portion of the SMA wire 30. The heat sink may be arranged in a number of ways to achieve such a substantially uniform thermal environment.

The SMA wire 30 and the heat sink 50 may be separated by a gap. So, the SMA wire 30 and the heat sink 50 may not be in direct contact with one another, at least in a middle portion of the SMA wire 30 (i.e. away from the connection portions of the SMA wire 30).

The heat sink 50 may comprise an edge or a surface that runs substantially parallel to the SMA wire 30. The minimum distance between the heat sink 50 and the major portion of the SMA wire 30 may be substantially constant. For example, minimum distance between the heat sink 50 and the major portion of the SMA wire 30 may vary by less than 10%, preferably less than 5%. The heat transfer from the SMA wire 30 to the heat sink 50 may depend primarily on the distance between SMA wire 30 and heat sink 50, for example when the heat sink 50 is made entirely from the same material and dominates the heat transfer away from the SMA wire 30. The heat sink 50 may be entirely made from a single material, making manufacture of the heat sink 50 simpler. However, in some embodiments the heat sink 50 may comprise portions of different material, with different distances between such portions of the heat sink and the SMA wire 30.

The distance between the SMA wire 30 and the heat sink 50 determines the rate of heat transfer from the SMA wire 30 to the heat sink 50, i.e. the cooling rate of the SMA wire 30. Depending on the use of the SMA actuator assembly, or exact design parameters of the SMA actuator assembly, it may be desirable to provide a relatively large cooling rate of the SMA wire 30 or a relatively small cooling rate of the SMA wire 30. Providing a larger cooling rate may allow for more rapid expansion after heating of the SMA wire 30 ceases, and so can lead to quicker response times. Providing a smaller cooling rate may allow for the SMA wire 30 to reach higher temperatures during heating, and so may increase the stroke of the SMA wire 30 or decrease the power requirement for heating the SMA wire 30.

The minimum distance (or shortest distance) between the heat sink 50 and the major portion of SMA wire 30 may be at least 25 μm. This may be a minimum distance required to avoid accidental contact between the SMA wire 30 and the heat sink 50. Preferably, the minimum distance between the heat sink 50 and the major portion of SMA wire 30 may be at least 75 μm, further preferably at least 150 μm. This can further reduce the risk of accidental contact between the SMA wire 30 and the heat sink 50. Such a minimum distance may also limit the maximum cooling rate, and thus improve the stroke of the SMA wire 30.

The minimum distance between the heat sink 50 and the major portion of SMA wire 30 may be less than 3 mm. Preferably, the minimum distance between the heat sink 50 and the major portion of SMA wire 30 is less than 2 mm, further preferably less than 1 mm or less than 700 μm. In some embodiments, the minimum distance between the heat sink 50 and the major portion of SMA wire 30 is less than 500 μm or less than 300 μm. An upper limit on the minimum distance between the heat sink 50 and the major portion of SMA wire 30 may ensure that the cooling rate remains relatively high, so as to improve the response time of actuating the SMA wire 30.

The heat sink 50 may be arranged closer to the major portion of the SMA wire 30 than any other component of the SMA actuator assembly (not necessarily including the connection elements 33). So, heat transfer from the SMA wire 30 may be dominated by the presence of the heat sink 50.

The SMA wire 30 may have a length of less than 8 mm, preferably less than 6.5 mm, further preferably less than 5.5 mm. Shorter SMA wires 30 may have a more non-uniform thermal environment than long SMA wires 30, in the absence of a heat sink 50. So, the provision of the heat sink 50 may be particularly advantageous in combination with relatively short SMA wires 30.

The heat sink 50 may be fixed relative to the support structure 10 and/or relative to the movable part 20. The heat sink 50 may be integrally formed with the support structure 10 and/or the movable part 20, or a portion of the support structure 10 and/or the movable part 20. This may make manufacture of the heat sink 50 simpler, because no separate step of providing the heat sink is required. For example, the heat sink 50 may be made from the same material as the support structure 10 and/or the movable part 20. Alternatively, the heat sink 50 may be provided separately from the support structure 10 and/or the movable part 20, and fixed to the support structure 10 and/or the movable part 20 during assembly of the SMA actuator assembly 2. This may allow the heat sink 50 to be made from different materials, and may enable more targeted tailoring of the properties of the heat sink 50.

The heat sink 50 may be formed from a metal, such as a steel. A metal may be particularly suitable due to its high thermal conductivity. In general, any other materials, especially those with relatively high thermal conductance (e.g. >1 W/m K, preferably >10 W/m K,), may be suitable to form the heat sink 50.

The heat sink 50 may be integrally formed with one of the connection elements 33, for example. The connection elements 33 may be crimps formed from sheet metal, which material may be especially suitable as a heat sink 50. The connection elements 33 are already provided adjacent to the SMA wire 30, and so providing the heat sink 50 as an extension of the connection elements 33 may be particularly advantageous for manufacturing purposes.

Figure 3A:
FIGS. 3*a-c* show a schematic comparison of the thermal environment around SMA wires with or without different heat sinks.
Figure 3B:
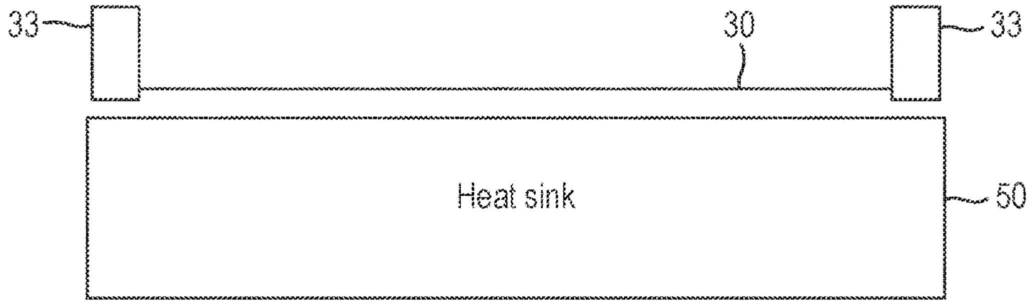
Figure 3C:
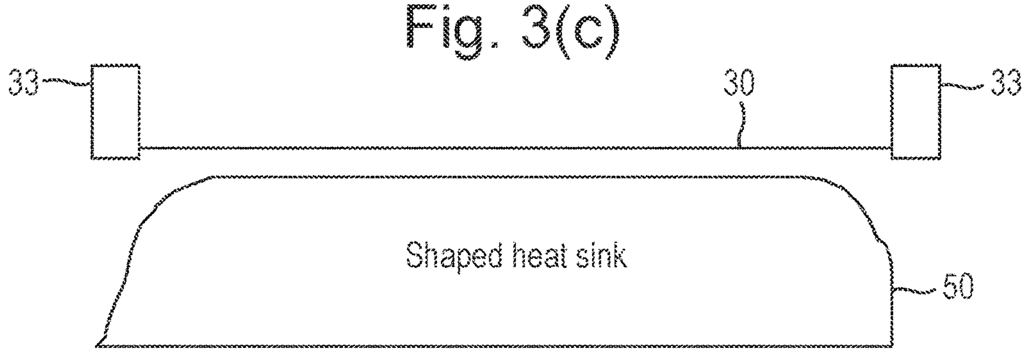
Figure 3D:
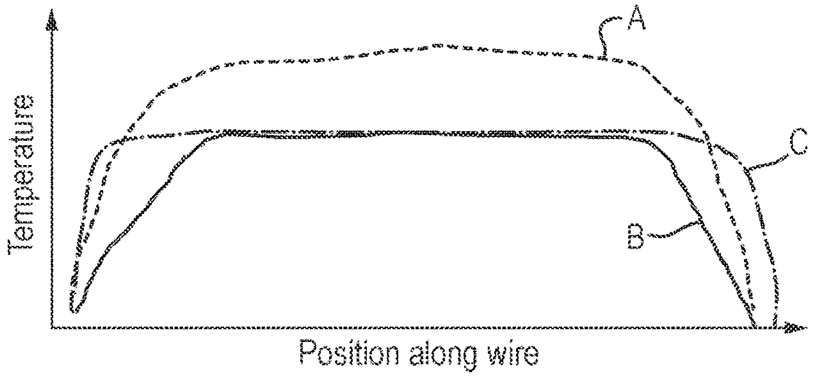

FIGS. 3*a*-*c* schematically show arrangements of SMA wires 30 with or without different heat sink designs. FIG. 3*d* shows a qualitative representation of the temperature distribution along the SMA wires 30 of FIGS. 3*a*-4*c*. The SMA wire 30 of FIG. 3*a* is not arranged adjacent to a heat sink 50. Heat transfer away from the SMA wire 30 takes place via the connection elements 33. So, as apparent from FIG. 3*d*, the temperature along the SMA wire 30 is relatively non-uniform. The SMA wire 30 of FIG. 3*b* is arranged adjacent to a heat sink 50. The heat sink 50 of FIG. 3*b* comprises an edge that runs parallel to the SMA wire 30. As shown in FIG. 3*d*, provision of the heat sink improves the uniformity of the temperature distribution along the SMA wire 30.

In some embodiments, the heat sink 50 is shaped to compensate for heat transfer through the connection elements 33. Specifically, designing the heat sink 50 so as to provide a relatively higher rate of heat transfer in the middle of the SMA wire 30 and a relatively lower rate of heat transfer at the ends of the SMA wire 30 (where heat transfer through the connection elements 33 is higher) may improve the uniformity of the temperature distribution along the SMA wire 30. As shown in FIG. 3*c*, the heat sink 50 may be shaped such that the minimum distance between the heat sink 50 the SMA wire 30 increases towards the ends of the SMA wire 30. So, the heat sink 50 tapers away from the SMA wire 30 towards the ends of the SMA wire 30. The minimum distance between the heat sink 50 and a middle section of the SMA wire 30 may be substantially constant.

Alternatively, parameters other than the distance between heat sink 50 and SMA wire 30 may be varied along the SMA wire 30, so as to compensate for heat transfer through the connection elements 33. For example, the heat sink 50 may comprise different materials along the SMA wire 30, in particular a material with relatively high thermal conductivity adjacent to a middle portion of the SMA wire 30 and a material with a relatively low thermal conductivity adjacent to the ends of the SMA wire 30. In general, the heat sink 50 may be configured such that the thermal heat transfer from the SMA wire 30 to the heat sink 50 decreases towards the ends of the SMA wire 30. This, in combination with heat conduction through the connection elements 33, may improve the overall uniformity of the thermal environment along the SMA wire. This is qualitatively depicted in FIG. 3*d*.

In many of the SMA actuator assemblies 2 described above in relation to FIG. 1, two or more SMA wires 30 are arranged to move the movable part 20 relative to the support structure 10. The two or more SMA wires may, for example, be opposing SMA wires 30, i.e. SMA wires 30 that are arranged to apply opposing forces to the movable part 20 with respect to the support structure 10.

In such SMA actuator assemblies 2, the provision of heat sinks 50 for setting the thermal environment along the SMA wires 30 may be particularly advantageous. In some embodiments with multiple SMA wires 30, one or more heatsinks 50 are arranged adjacent to each SMA wire 30 such that the thermal environment along a major portion of each SMA wire 30 is substantially the same. For example, the total heat transfer away from the major portion of each SMA wire 30 (at the same temperature), or away from each SMA wire, may be substantially the same, e.g. differ by less than 10%, preferably less than 5%. The temperature distribution along each SMA wire 30 may be substantially the same. Ensuring that the thermal environment along the major portion (e.g. at least 75%, or at least 90%) of each SMA wire 30 is substantially the same may make actuation of the combination of SMA wires 30 more controllable and/or accurate. Providing the same thermal environment may allow the same control signals to be used to heat each SMA wire 30, so as to achieve the same actuation among the SMA wires 30.

In some embodiments of the SMA actuator assembly 2, the SMA wire 30 may move laterally in a movement plane across a range of movement. For example, the SMA wire 30 may, on contraction, move laterally in the movement plane across the range of movement. In other words, the ends of the SMA wire 30 may, in addition to moving towards each other, also tilt relative to one another. The SMA wire 30 may also move laterally when not contracting, e.g. when the movable part is moved by another SMA wire 30 or moved in any other way. In particular, the SMA wires 30 may move laterally between a first extreme position and a second extreme position.

Such SMA actuator assemblies 2 include SMA actuator assemblies that use mechanical gain to amplify the motion by a given SMA wire stroke. The SMA actuator assembly 2 may thus comprise an intermediary element between the SMA wire 30 and the movable part 20. The intermediary element may be configured to amplify the movement of an end of the SMA wire 30, such that the movable part 20 moves by a greater amount than the movable end of the SMA wire 30 relative to a static end of the SMA wire. The transition times of these actuators is critical and is often limited by the cooling rate of the SMA wire 30. As such, it is desirable to increase and/or accurately set the cooling rate in such designs.

The above-described heat sinks 50 may provide for a uniform thermal environment as described above in one or both of the extreme positions.

In some embodiments, the heat sink 50 is arranged such that the thermal environment along the major portion of the SMA wire is substantially constant over the range of movement of the SMA wire. So, the heat sink may keep the thermal environment constant in both of the first and second extreme positions, as well as in between the first and second extreme positions.

In some embodiments, the heat sink 50 is arranged adjacent to the movement plane of the SMA wire 30. The heat sink 50, in particular a surfacer of the heat sink 50 facing the SMA wire 30, may extend in a plane parallel to the movement plane. So, the distance between the heat sink 50 and the SMA wire 30 may remain substantially the same as the SMA wire 30 moves laterally in the movement plane.

In some embodiments, the heat sink 50 may be arranged to move with the SMA wire 30. For example, the heat sink 50 may be mechanically connected at one end to the support structure 10 and at the other end to the movable part 20. The heat sink 50 may be formed from a spring arm, for example. The heat sink 50 may pivot relative to the support structure 10 and/or the movable part 20 upon movement of the movable part 20 relative to the support structure 10. The heat sink 50 may move in concert with the SMA wire 30, such that the distance between the heat sink 50 and the SMA wire 30 remains substantially the same as the SMA wire 30 moves laterally in the movement plane.

Figure 4A:
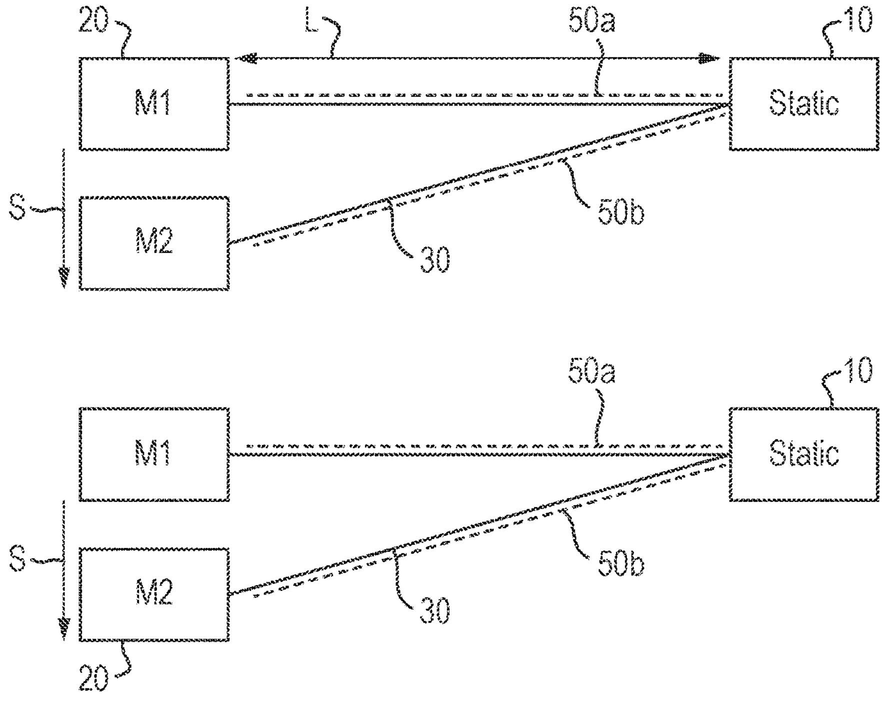
FIGS. 4*a* and 4*b* are schematic views of an SMA actuator assemblies with a split heat sink.
Figure 4B:
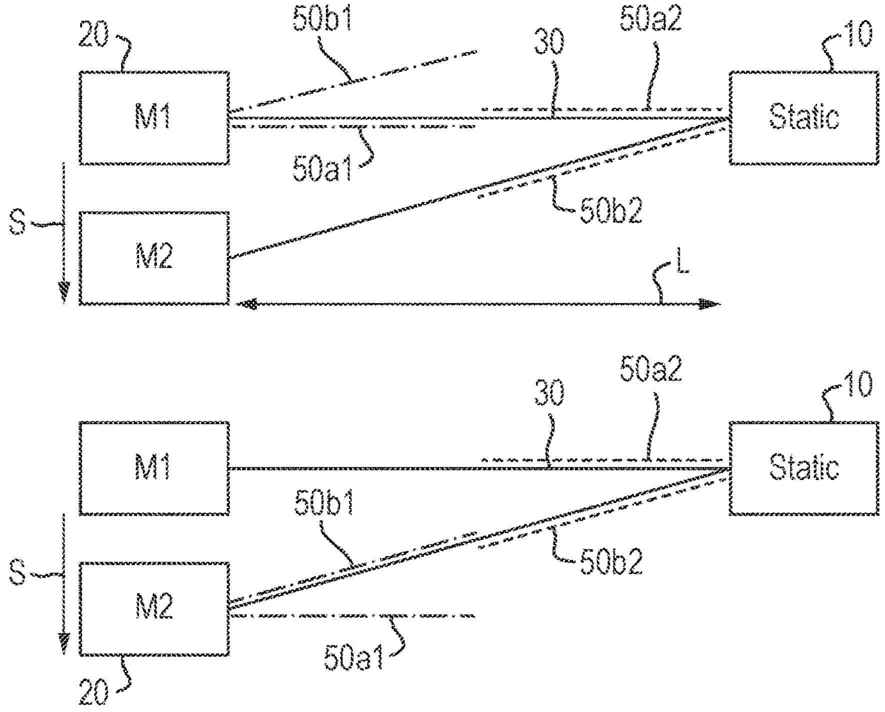

In some embodiments, the heat sink 50 may be split into two or more heat sink portions. FIGS. 4*a* and 4*b*, for example, show an SMA wire 30 that moves laterally in a movement plane (defined by the plane of the drawing sheet) between a first extreme position and a second extreme position. The movable part 20 moves relative to the static part 10 between the first extreme position and the second extreme position.

In the embodiment of FIG. 4*a*, the heat sink 50 comprises a first portion 50*a* arranged adjacent to the first extreme position. As such, the thermal environment along a major portion of the SMA wire 30 in the first extreme position is substantially constant. The heat sink 50 further comprises a second portion 50*b* arranged adjacent to the second extreme position. As such, the thermal environment along a major portion of the SMA wire 30 in the second extreme position is substantially constant. Provision of the heat sink 50 with both first and second portions may improve the uniformity of the thermal environment around the SMA wire 30 and increasing the cooling rate compared to a situation in which only one of the portions is provided.

In FIG. 4*a*, the heat sink 50 is fixedly attached to the support structure 10. Alternatively, the heat sink 50 may be fixedly attached to the movable part 20.

In FIG. 4*a*, the average distance between the SMA wire 30 and the first portion 50*a* of the heat sink is 0 in the first extreme position and S/2 in the second extreme position. The average distance between the SMA wire 30 and the second portion 50*b* of the heat sink is S/2 in the first extreme position and 0 in the second extreme position. So, the overall average distance between heat sink 50 (i.e. including both portions 50*a*, 50*b*) and the SMA wire 30 is S/4.

In some embodiments, the average distance between the SMA wire 30 and the heat sink 50 may be reduced further. In particular, FIG. 4*b* shows a heat sink 50 that comprises a static portion 50*a*2, 50*b*2 that is fixed relative to the support structure 10. The heat sink 50 further comprises a movable portion 50*a*1, 50*b*1 that is fixed relative to the movable part 20. The static portion 50*a*2, 50*b*2 extends part-way along the SMA wire 30, and the movable portion 50*a*1, 50*b*1 extends part-way along the SMA wire 30. For example, the static portion 50*a*2, 50*b*2 extends along the half of the SMA wire 30 that is connected to the support structure 10, and the movable portion 50*a*1, 50*b*1 extends along the half of the SMA wire 30 that is connected to the movable part 20.

As shown in FIG. 4*b*, the static portion 50*a*2, 50*b*2 may comprise a first portion 50*a*2 arranged adjacent to the first extreme position such that the thermal environment along a major portion of the half of the SMA wire in the first extreme position is substantially constant. The static portion 50*a*2, 50*b*2 further comprises a second portion 50*b*2 arranged adjacent to the second extreme position such that the thermal environment along a major portion of the half of the SMA wire 30 in the second extreme position is substantially constant. The movable portion 50*a*1, 50*b*1 comprises a first portion 50*a*1 arranged adjacent to the first extreme position such that the thermal environment along a major portion of the half of the SMA wire 30 in the first extreme position is substantially constant. The movable portion 50*a*1, 50*b*1 further comprises a second portion 50*b*1 arranged adjacent to the second extreme position such that the thermal environment along a major portion of the half of the SMA wire in the second extreme position is substantially constant.

In FIG. 4*b*, the average distance between the SMA wire 30 and the first portion 50*a*1 of the movable portion of the heat sink 50 is 0 in the first extreme position and S/4 in the second extreme position. The average distance between the SMA wire 30 and the second portion 50*b*1 of the movable portion of the heat sink 50 is S/4 in the first extreme position and 0 in the second extreme position. The average distance between the SMA wire 30 and the first portion 50*a*2 of the static portion of the heat sink 50 is 0 in the first extreme position and S/4 in the second extreme position. The average distance between the SMA wire 30 and the second portion 50*b*2 of the static portion of the heat sink 50 is S/2 in the first extreme position and 0 in the second extreme position. So, the overall average distance between heat sink 50 (i.e. including portions 50*a*1, 50*b*1, 50*a*2, 50*b*2) and the SMA wire 30 is S/8. The average distance between SMA wire 30 and heat sink 50 is thus halved in the design of FIG. 4*b* compared to the design of FIG. 4*a*, improving the uniformity of the thermal environment around the SMA wire 30 and increasing the cooling rate.

The distance between select portions of the heat sink 50 and the SMA wire 30 is described as "0" above. In the embodiments of FIGS. 4*a* and 4*b*, the SMA wire 30 may be in contact with the heat sink 50 in one or both of the extreme positions. Alternatively, the heat sink 50 may be adjacent to, and not in contact with, the heat sink 50 in the first and second extreme positions, for example in the manner described above in relation to FIGS. 1-3.

The above-described embodiments relate primarily to SMA actuator assemblies 2 in which the heat sink 50 is arranged adjacent to the SMA wire 30. The heat sink 50 is not in direct thermal contact with the SMA wire 30 between its ends. In some SMA actuator assemblies 2, the SMA wire 30 may be arranged to be in contact between its ends (i.e. in a middle portion of the SMA wire 30) with one or more contact portions of the movable part 20 and/or support structure 10. The contact portions allow conductive heat transfer from the SMA wire 30, and so may be considered to correspond to a heat sink 50. So, the SMA wire 30 may contact the heat sink 50 at locations other than its ends, which are connected to the connection elements 33.

In some embodiments, the SMA wire 30 may be arranged to bend around the one or more contact portions. The SMA wire 30 may, upon contraction, apply a force to the one or more contact portions relative to the connection elements 33. This may move at least some of the one or more contact portions relative to the connection elements 33. The contact portions may be provided primarily for the purpose of providing the actuation mechanism of the SMA actuator assembly 2, and heat transfer through the contact portions may be a secondary or even undesirable purpose.

Figure 5A:
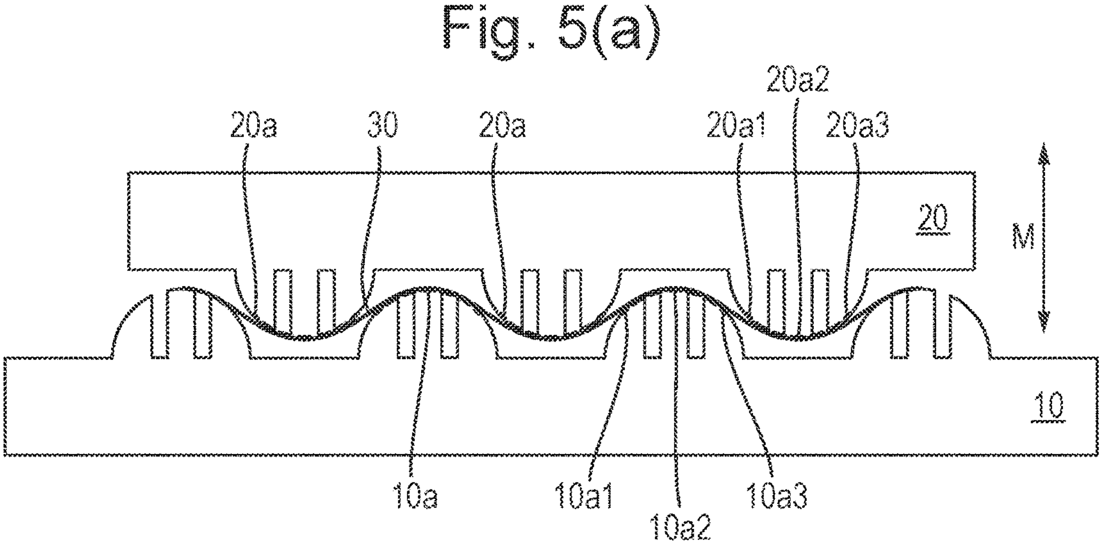
FIGS. 5*a* and 5*b* schematically depict SMA actuator assemblies in the form of haptic waves.
Figure 5B:
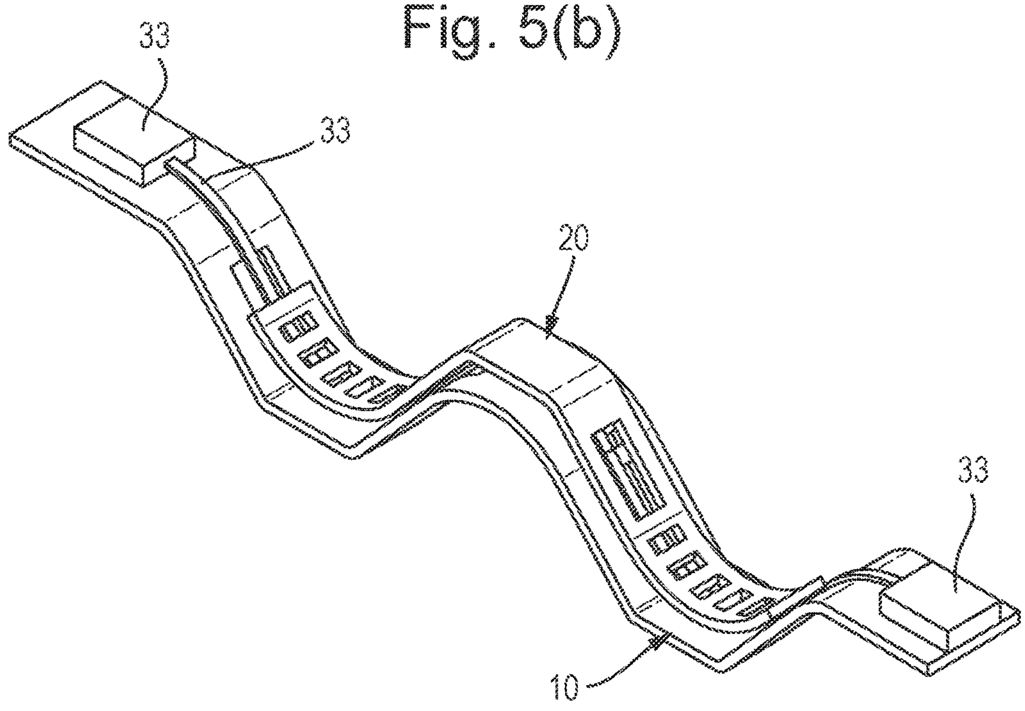

The SMA actuator assembly 2 may, for example, be a haptic wave. The haptic wave may be arranged to provide haptic feedback to a user. Examples of a haptic wave are described in PCT/GB2020/053252, PCT/GB2021/050054 and PCT/GB2021/050159, each of which is hereby incorporated by reference. FIGS. 5*a* and 5*b*, for example, schematically depict SMA actuator assemblies that are haptic waves. The SMA actuator assemblies comprise a movable part 20 and a support structure 10. The movable part 20 and the support structure 10 are movable relative to each other along a movement axis M.

The one or more contact portions of the movable part 20 and/or support structure 10 guide the SMA wire 30 along a tortuous path. A curved section of the SMA wire 30 extending around the or each contact portion. Intermediate sections of the SMA wire 30 extend between the movable part 20 and the support structure 10. The movable part 20 and the support structure 10 are driven in opposite directions along the movement axis M on contraction of the SMA wire 30.

As shown in FIGS. 5*a* and 5*b*, each of the movable part 20 and the support structure 10 may comprise at least one contact portion 10*a*, 20*a* which contacts the SMA wire 30 on opposite sides thereof. The movable part 20 and/or the support structure 10 may have plural contact portions. The contact portions of the movable part 20 and the support structure 10 may alternate in a direction normal to the movement axis M.

The SMA wire 30 may be connected at each end to the movable part or the support structure by respective connection elements 33 that hold the SMA wire 30. The connection elements 33 may be crimp elements fixed to the movable part or the support structure.

In some embodiments, at least one of the movable part 20 and the support structure 10, preferably both of the movable part 20 and the support structure 10, comprises a moulded body of material. This is schematically depicted in FIG. 5*a*. Alternatively, at least one of the movable part 20 and the support structure 10, preferably both of the movable part 20 and the support structure 10, comprises a sheet of material that is shaped to define the contact portions. This is schematically depicted in FIG. 5*b*.

The haptic waves of FIGS. 5*a* and 5*b* are examples of an SMA actuator assembly 2 in which the SMA wire 30 is arranged to be in contact between its ends with one or more contact portions of the movable part 20 and/or support structure 10. Other such SMA actuator assemblies may be provided for the purposes of providing OIS or AF functionality, for example in a miniature camera. WO 2007/113478 A1, which is hereby incorporated by reference, discloses an SMA actuator assembly for providing AF. The SMA actuator assembly 2 comprises a support structure 10 and a movable part 20 that is movable relative to the support structure 10 along a movement axis. At least one SMA wire 30 is connected at its ends to the support structure 10, and bends around a contact portion with the movable part 20. The SMA wire 30 thus comprises two portions (in particular straight portions) that are angled relative to each other. The two portions are angled relative to the principal axis of the SMA actuator assembly 2, and are angled relative to the plane orthogonal to the principal axis of the SMA actuator assembly 2. Upon contraction of the SMA wire 30, the SMA wire 30 moves the contact portions (and thereby the movable part 20) along the principal axis. So, upon contraction, the ends of the SMA wire 30 remain stationary relative to each other, but the middle of the SMA wire (between the two portions of the SMA wire 30 that are angled relative to each other) moves so as to move the movable part 20.

In the above-described embodiments of SMA actuator assemblies 2, in which the SMA wire 30 is arranged to be in contact between its ends with one or more contact portions of the movable part 20 and/or support structure 10, it may be desirable to limit cooling of the SMA wire 30 via the contact portions.

In embodiments of the present invention, the one or more contact portions 10*a*, 20*a* (schematically depicted as dashed lines in FIG. 5*a*) are provided as non-continuous contact portions 10*a*, 20*a*. So, the contact portions 10*a*, 20*a*, may be separated into a plurality of contact sections 10*a*1-3, 20*a*1-3. The contact sections 10*a*1-3, 20*a*1-3 are in direct contact with the SMA wire 30. The contact sections 10*a*1-3, 20*a*1-3 are separated by one or more gaps between the contact sections 10*a*1-3, 20*a*1-3. Providing non-continuous contact portions 10*a*, 20*a* reduces the cooling rate of the SMA wire 30 through the contact portions 10*a*, 20*a* compared to a situation in which continuous contact portions 10*a*, 20*a* are provided. Such reduced cooling may reduce the power required to heat and drive contraction of the SMA wire 30. Reduced cooling in the contact regions 10*a*, 20*a* may also improve the overall uniformity of the thermal environment around the SMA wire 30, because the difference in heat transfer at the contact portions 10*a*, 20*a* and at portions of the SMA wire 30 between the contact portions 10*a*, 20*a* is reduced.

In preferred embodiments, the ratio of the width of the one or more gaps to the diameter of the SMA wire is less than 20, preferably less than 10, more preferably less than 5. In preferred embodiments, the ratio of the width of the one or more gaps to the diameter of the SMA wire is less than 40, preferably less than 15, more preferably less than 5. Similarly, the ratio of the width of the contact sections 10*a*1-3, 20*a*1-3 to the diameter of the SMA wire 30 may be less than 20, preferably less than 10, more preferably less than 5. The ratio of the width of the contact sections 10*a*1-3, 20*a*1-3 to the diameter of the SMA wire 30 may be less than 40, preferably less than 15, more preferably less than 5. So, the gaps and/or contact sections are relatively short. The distance between points of contact with the SMA wire is relatively small, desirably small compared to the characteristic length scale of wire cooling along an SMA wire 30 that is suspended in air. Such a small distance may improve uniform cooling of the SMA wire 30.

In the embodiment of FIG. 5*b*, the support structure 10 and/or movable part 10 are formed from a sheet material, such as sheet metal. This may make manufacture of the support structure 10 and/or movable part 10 relatively simple, e.g. by suitable etching and/or forming techniques. The gaps between the contact sections 10*a*1-3, 20*a*1-3 may be formed as slots in the sheet material. Alternatively, the gaps may be formed by recesses that extend partway through the sheet of material. This may improve the structural integrity of the haptic wave compared to a situation in which the gaps are formed as slots that extend through the sheet of material.

Figure 6:
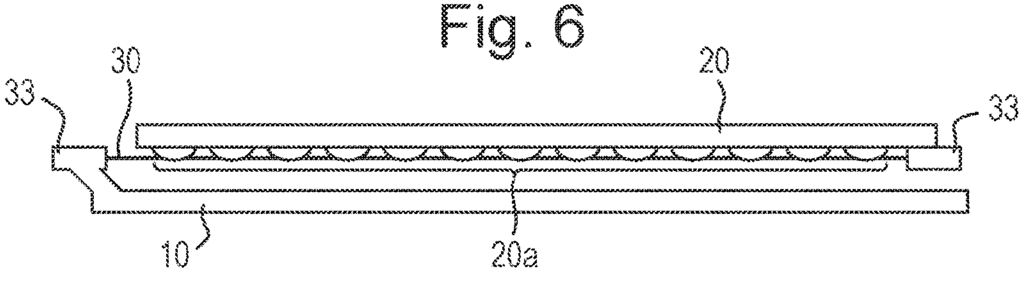
FIG. 6 schematically depicts another embodiment of an SMA actuator assembly.

FIG. 6 schematically depicts another embodiment of an SMA actuator assembly 2 in which the SMA wire 30 is arranged to be in contact between its ends with one or more contact portions of the movable part 20 and/or support structure 10. Compared to the above-described embodiments, the SMA wire 30 in FIG. 6 does not bend around the one or more contact portions. The SMA wire 30 is connected between the movable part 10 and the support structure 20 by connection elements 33. The connection elements 33 may be crimps. Upon contraction of the SMA wire 30, the connection elements 33 may move toward one another. The SMA wire 30 is substantially straight between the connection elements 33.

The SMA actuator assembly 2 of FIG. 6 may, for example, correspond to the above-described SMA actuator assembly 2 of WO 2013/175197 A1 (in which a total of four SMA wires are used to provide OIS, by moving a movable lens element relative to an image sensor on a support structure to any position across a range of movement in two orthogonal directions, without applying any net torque to the movable part) with the addition of a contact portion between the ends of the SMA wire. Alternatively, the SMA actuator assembly 2 of FIG. 6 may correspond to the above-described SMA actuator assembly 2 of WO 2017/072525 A1 (in which SMA wires are used to provide OIS by moving a movable image sensor relative to a lens element) with the addition of a contact portion between the ends of the SMA wire or to the above-described SMA actuator assembly 2 of WO 2011/104518 A1 (in which eight SMA wires that are each inclined with respect to a notional primary axis are used to provide OIS and/or AF) with the addition of a contact portion between the ends of the SMA wire. In general, the SMA actuator assembly 2 of FIG. 6 may be any SMA actuator assembly in which an SMA wire 30 comprises a straight portion that is in contact with one or more contact regions on the support structure and/or movable part.

As schematically shown in FIG. 6 and as described in relation to FIGS. 5*a* and 5*b*, the contact region 20*a* may be non-continuous. So, the contact portion may comprise a plurality of contact sections that are in direct contact with the SMA wire 30, wherein the plurality of contact sections are separated by one or more gaps between the contact sections. Preferably, the ratio of the width of the one or more gaps to the diameter of the SMA wire is less than 20, preferably less than 10, more preferably less than 5. Similarly, the ratio of the width of the contact sections 10*a*1-3, 20*a*1-3 to the diameter of the SMA wire 30 may be less than 20, preferably less than 10, more preferably less than 5. The ratio of the width of the one or more gaps to the diameter of the SMA wire may be less than 40, preferably less than 15, more preferably less than 5. Similarly, the ratio of the width of the contact sections 10*a*1-3, 20*a*1-3 to the diameter of the SMA wire 30 may be less than 40, preferably less than 15, more preferably less than 5.

Provision of the contact region between the ends of the SMA wire 30 may increase the cooling rate of the SMA wire. This may improve the response time of the SMA actuator assembly. Providing a non-continuous contact region allows the cooling rate of the SMA wire to be limited and appropriately set. Larger gaps and shorter contact sections may reduce the cooling rate, and vice versa.

The contact region may extend along a major portion of the SMA wire 30. For example, the contact region may extend along at least 50% of the SMA wire, preferably at least 75% of the SMA wire 30, further preferably at least 90% of the SMA wire.

In FIG. 6, the contact region is provided specifically for the purpose of acting as a heat sink. The contact region may be arranged such that the thermal environment along the major portion of the SMA wire 30 is substantially constant, as described above in relation to FIGS. 1 and 2.

In embodiments in which the SMA wire 30 moves laterally in a movement plane, the contact region may be arranged as described above in relation to FIGS. 4*a* and 4*b*. The contact region may also be configured such that the thermal environment along the major portion of the SMA wire 30 is substantially constant over the range of movement of the SMA wire 30. For example, the contact region may extend in parallel with the movement plane. The contact region, and the contact sections, may remain in contact with the SMA wire 30 through the movement range of the SMA wire 30, and throughout the movement range of the movable part 20 relative to the support structure 10. Alternatively, the contact region may be arranged to move with the SMA wire so as to remain in contact with the SMA wire as the SMA wire moves laterally in the movement plane.

The above-described SMA actuator assemblies comprise an SMA wire. The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The invention claimed is:

1. An SMA actuator assembly comprising:

a support structure;

a movable part that is movable relative to the support structure; and an SMA wire connected at its ends to the movable part and/or the support structure and arranged to move the movable part relative to the support structure, wherein:

the SMA wire is arranged to be in contact between its ends with one or more contact portions of the movable part and/or support structure;

each contact portion comprises a plurality of contact sections that are in direct contact with the SMA wire; and the plurality of contact sections are separated by one or more gaps between the contact sections;

wherein the SMA wire does not enter the gaps between contact sections.

2. The SMA actuator assembly of claim 1, wherein a ratio of the width of the contact sections to the diameter of the SMA wire is less than 40.

3. The SMA actuator assembly of claim 1, wherein the contact sections are substantially evenly spaced apart along a major portion of the SMA wire.

4. The SMA actuator assembly of claim 1, wherein:

the SMA wire is connected between the movable part and the support structure by connection elements; and the SMA wire is substantially straight between the connection elements.

5. The SMA actuator assembly of claim 4, wherein;

the SMA wire is arranged, on contraction, to pivot within a movement plane about at least one of the connection elements upon movement of the movable part relative to the support structure;

the contact sections are provided in the movement plane; and the contact sections are arranged to remain in contact with the SMA wire throughout the entire range of movement of the SMA wire.

6. The SMA actuator assembly of claim 1, wherein the contact sections extend in a plane.

7. The SMA actuator assembly of claim 1, wherein the SMA wire is arranged to bend around the one or more contact portions.

8. The SMA actuator assembly of claim 7, wherein:

the movable part and the support structure are movable relative to each other along a movement axis; and the one or more contact portions of the movable part and/or support structure guide the SMA wire along a tortuous path with a curved section of the SMA wire extending around each of the one or more contact portions and intermediate sections of the SMA wire extending between the movable part and the support structure such that the movable part and the support structure are driven in opposite directions along the movement axis on contraction of the SMA wire.

9. The SMA actuator assembly of claim 8, wherein:

each of the movable part and the support structure comprises at least one contact portion which contacts the SMA wire on opposite sides thereof, the movable part has plural contact portions, the contact portions of the movable part and the support structure alternating in a direction normal to the movement axis; and each of the movable part and the support structure has plural contact portions.

10. The SMA actuator assembly of claim 1, wherein a ratio of the width of the one or more gaps to the diameter of the SMA wire is less than 40.

11. The SMA actuator assembly of claim 1, wherein the one or more contact portions including a first contact portion, a second contact portion, and a third contact portion, the first and second contact portions carried by one of the support structure and the movable part, the third contact portion carried by the other of the support structure and the movable part, the third contact portion positioned along the SMA wire in between the first contact portion and the second contact portion, wherein movement of the movable part toward the support structure causes the third contact portion to push a section of the SMA wire in between the first contact portion and the second contact portion and to bend the section of the SMA wire around the third contact portion such that the SMA wire extends across the gaps of the third contact portion without being pushed into the gaps of the third contact portion.

12. The SMA actuator assembly of claim 8, wherein the one or more contact portions including a first contact portion, a second contact portion, and a third contact portion, the first and second contact portions carried by one of the support structure and the movable part, the third contact portion carried by the other of the support structure and the movable part, the third contact portion positioned along the SMA wire in between the first contact portion and the second contact portion, wherein movement of the movable part toward the support structure causes the third contact portion to push a section of the SMA wire in between the first contact portion and the second contact portion and to bend the section of the SMA wire around the third contact portion such that the SMA wire extends across the gaps of the third contact portion without being pushed into the gaps of the third contact portion; and wherein the curved section of the SMA wire extending around the third contact section and across the gaps of the third contact section is concave toward the gaps of the third contact section.

* * * * *